(12) United States Patent
Zhong et al.

(10) Patent No.: US 10,539,650 B2
(45) Date of Patent: Jan. 21, 2020

(54) ANTENNA CONTROL METHOD, APPARATUS AND COMPUTER STORAGE MEDIUM

(71) Applicant: Ninebot (Beijing) Tech. Co., Ltd, Beijing (CN)

(72) Inventors: Yincheng Zhong, Beijing (CN); Guanjiao Ren, Beijing (CN); Xuhui Wang, Beijing (CN); Li Pu, Beijing (CN)

(73) Assignee: Ninebot (Beijing) Tech. Co., Ltd, Beijing (CN)

( * ) Notice: Subject to any disclaimer, the term of this patent is extended or adjusted under 35 U.S.C. 154(b) by 276 days.

(21) Appl. No.: 15/523,717

(22) PCT Filed: Oct. 17, 2016

(86) PCT No.: PCT/CN2016/102278
§ 371 (c)(1),
(2) Date: May 2, 2017

(87) PCT Pub. No.: WO2018/028049
PCT Pub. Date: Feb. 15, 2018

(65) Prior Publication Data
US 2018/0267136 A1    Sep. 20, 2018

(30) Foreign Application Priority Data
Aug. 8, 2016    (CN) .......................... 2016 1 0643795

(51) Int. Cl.
*G01S 5/02* (2010.01)
*H01Q 3/10* (2006.01)
(Continued)

(52) U.S. Cl.
CPC .................. *G01S 5/06* (2013.01); *G01S 3/12* (2013.01); *G01S 3/42* (2013.01); *G01S 5/0221* (2013.01);
(Continued)

(58) Field of Classification Search
CPC . G01S 5/02; G01S 5/06; G01S 5/0221; G01S 3/12; G01S 3/42; G01S 3/48;
(Continued)

(56) References Cited

U.S. PATENT DOCUMENTS

| 6,034,643 A | * | 3/2000 | Nishikawa | ............... H01Q 3/08 343/765 |
| 2013/0050021 A1 | * | 2/2013 | Wang | ................... H01Q 1/2291 342/359 |

FOREIGN PATENT DOCUMENTS

| CN | 2770113 Y | 4/2006 |
| CN | 103853197 A | 6/2014 |

(Continued)

OTHER PUBLICATIONS

Int. Preliminary Report cited in Application No. PCT/CN2016/102278 dated Feb. 12, 2019, 9 pgs.

*Primary Examiner* — Dao L Phan
(74) *Attorney, Agent, or Firm* — Cooper Legal Group, LLC

(57) ABSTRACT

An antenna control method, communications positioning apparatus and computer storage medium is provided. The method is used in a communications positioning apparatus. The communications positioning apparatus comprises a communications antenna and a rotation device. The communications antenna comprises at least two antennas. The rotation device drives the communications antenna to rotate, wherein the method comprises: acquiring a first command, wherein the first command turns on a positioning mode; in response to the first command, acquiring angle information corresponding to the communications antenna and a beacon; in accordance with the angle information, determining corresponding rotation parameters of the rotation device, wherein the rotation parameters comprise at least a rotation direction and a rotation angle; and in accordance with the (Continued)

rotation parameters, controlling the rotation device to drive the rotation direction and rotation angle corresponding to the communications antenna.

20 Claims, 4 Drawing Sheets

(51) Int. Cl.
    *G01S 5/06*     (2006.01)
    *H01Q 3/02*     (2006.01)
    *H04B 7/04*     (2017.01)
    *G01S 3/12*     (2006.01)
    *G01S 3/42*     (2006.01)
    *G01S 3/48*     (2006.01)
    *G01S 5/12*     (2006.01)

(52) U.S. Cl.
    CPC ................. *H01Q 3/02* (2013.01); *H01Q 3/10* (2013.01); *H04B 7/04* (2013.01); *G01S 3/48* (2013.01); *G01S 5/12* (2013.01)

(58) Field of Classification Search
    CPC ... G01S 5/12; H04B 7/04; H01Q 3/02; H01Q 3/08; H01Q 3/10
    USPC .......................................................... 342/430
    See application file for complete search history.

(56) References Cited

FOREIGN PATENT DOCUMENTS

| | | |
|---|---|---|
| CN | 104167606 A | 11/2014 |
| CN | 204927527 U | 12/2015 |

\* cited by examiner

ANTENNA CONTROL METHOD, APPARATUS AND COMPUTER STORAGE MEDIUM

TECHNICAL FIELD

The present invention relates to the field of communications positioning, and more particularly to an antenna control method, apparatus and computer storage medium.

TECHNICAL BACKGROUND

Along with the continuous development of science and technology, communication positioning technology has also rapidly developed, in particular, UWB (Ultra Wideband) carrier free communications technology. In the early stages, UWB was applied to high-speed data transmission at close ranges. In recent years, sub-nanosecond ultra-narrow pulse is being applied to close-range precision positioning.

Advantages of UWB positioning include high precision, a small size, and low power consumption etc., having the potential for broad applications. In particular, for an ideal situation, a high positioning precision may be acquired, using PDOA (Phase Difference of Arrival), when the positioning algorithm of an arrival angle of a signal is used to determine positioning. When using the PDOA method for positioning, the system is divided into two parts, one part is called an anchor node (Anchor), and the other part is called a beacon (Tag). The beacon transmits a set of time stamped packets, and when received by the anchor node, in accordance with the time stamped information, the distance corresponding therebetween is calculated. At the same time, the anchor node has two sets of receiver chips and antennas, wherein the anchor node can calculate the azimuth (angle) of the beacon by analyzing the phase difference of the signals received by the two sets of receiver chips.

However, there is a problem when PDOA is used to determine the direction and distance of the beacon. As shown in FIG. 1, when the tag is located near the front center of the two antennas of the anchor, measurement precision is high. However, when the tag is located toward the two sides or back, measurement precision is low. Thus, there exists a current technical problem for UWB, wherein when signals arrive from angles for positioning, within some ranges, measurement precision is low.

SUMMARY OF INVENTION

In order to solve the current technical problems, an embodiment of the present invention provides an antenna control method, apparatus and computer storage medium An embodiment of the present invention provides an antenna control method that is used in a communications positioning apparatus, the communications positioning apparatus comprises a communications antenna and a rotation device, the communications antenna comprises at least two antennas, the rotation device drives the communications antenna, the method comprising: acquiring a first command, wherein the first command turns on a positioning mode;

in response to the first command, acquiring angle information corresponding to the communications antenna and a beacon;

in accordance with the angle information, determining corresponding rotation parameters of the rotation device, wherein the rotation parameters comprise at least a rotation direction and a rotation angle; and in accordance with the rotation parameters, controlling the rotation device to drive the rotation direction and rotation angle corresponding to the communications antenna, such that the beacon is on the perpendicular bisector of the front surface of the communications antenna, or such that the beacon is located within a first included angle range of the front surface of the communications antenna, wherein the perpendicular bisector of the front surface of the communication system is within the first included angle range of the front surface of the communications antenna.

Optionally, the rotation parameters further comprise a rotation speed, wherein the rotation speed increases when the absolute value of the angle of the angle information corresponding to the communications antenna and the beacon increases.

Optionally, the method further comprises:

when the beacon is on the perpendicular bisector of the front surface of the communications antenna, or when the beacon is located within the first included angle range of the front surface of the communications antenna, determining a current rotation angle α of the rotation device's rotation platform, and determining a current angle θ corresponding to the communications antenna and the beacon, by a positioning detector of the rotation device; and calculating a sum of α and θ as the angle corresponding to the communications positioning apparatus and the beacon.

Optionally, the angle information corresponding to the communications antenna and the beacon comprises a first included angle value, the first included angle value is in the range of [−90°, 90°], wherein in accordance with the angle information, determining corresponding rotation parameters of the rotation device comprises:

when the first included angle value is positive, determining the rotation direction as a first preset direction, such as when the beacon is located toward the front surface of the communications antenna, the absolute value corresponding to the relative angle of the beacon and the perpendicular bisector of the front surface will become smaller if the communications antenna rotates according to the first preset direction; and when the first included angle value is negative, determining the rotation direction as a second preset direction which is opposite to the first preset direction; and determining the rotation angle as an absolute value corresponding to the first angle value.

Optionally, the method further comprises:

when the rotation device drives the communications antenna to rotate at an angle which is smaller than the rotation angle, determining a second included angle value corresponding to the communications antenna and the beacon;

determining a magnitude of the absolute values of the first included angle value and the second included angle value; and if the absolute value corresponding to the second included angle value is less than the absolute value corresponding to the first included angle value, determining that the beacon is located toward the front surface of the communications antenna; or if the absolute value corresponding to the second included angle value is greater than the absolute value corresponding to the first included angle value, determining that the beacon is located toward a back surface of the communications antenna.

Optionally, the method further comprises:

determining a first rotation speed of the rotation device at a start of rotation and determining a second rotation speed of the rotation device when the rotation device drives the communication antenna to rotate a preset angle which is smaller than the rotation angle;

determining whether the second rotation speed is slower than the first rotation speed; and if the second rotation speed is slower than the first rotation speed, determining that the beacon is located toward the front surface of the communications antenna; or if the second rotation speed is faster than the first rotation speed, determining that the beacon is located toward a back surface of the communications antenna.

The embodiment of the present invention also provides a communications positioning apparatus comprising a communications antenna and a rotation device, wherein the communications antenna comprises at least two antennas, the rotation device drives the communications antenna, and the communications positioning apparatus further comprises:

a command acquiring unit, configured to acquire a first command, wherein the first command turns on a positioning mode;

an angle acquiring unit, configured to in response to the command, acquire an angle information corresponding to the communications antenna and a beacon;

a parameters acquiring unit, configured to determine the rotation parameters of the rotation device according to the angle information, wherein the rotation parameters comprise at least a rotation direction and a rotation angle; and a control unit configured to control the rotation device to drive the communications antenna to rotate according to the rotation direction and rotation angle, such that the beacon is on the perpendicular bisector of the front surface of the communications antenna, or such that the beacon is located within a first included angle range of the front surface of the communications antenna, wherein the perpendicular bisector of the front surface of the communications antenna is within the first included angle range of the front surface of the communication antenna.

Optionally, the rotation parameters further comprise a rotation speed, and wherein the rotation speed increases when the absolute value of the angle of the angle information corresponding to the communications antenna and the beacon increases.

Optionally, the rotation device comprises:

a motor;

a rotation platform, wherein the rotation platform is connected to the motor, and wherein the communications antenna is disposed on the rotation platform such that the motor drives the rotation of the communications antenna; and a positioning detector, disposed on the rotation platform or the motor, for detecting the rotation angle of the rotation platform relative to the motor.

Optionally, the communications positioning apparatus further comprises:

a positioning unit, configured for when the beacon is on the perpendicular bisector of the front surface of the communication antenna, or when the beacon is located within a first included angle range of the front surface of the communications antenna, determining a current rotation angle α of the rotation device's rotation platform, and determining a current angle θ corresponding to the communications antenna and the beacon; and calculating the sum of α and θ as the angle corresponding to the communications positioning apparatus and the beacon, by the positioning detector.

Optionally, the rotation device comprises:

a main body, wherein the communications antenna is disposed on the main body; and a steering adjustment device of the main body, wherein the steering adjustment device is configured for adjusting the rotation of the main body, and wherein when the main body rotates, the communications antenna thereon also rotates.

Optionally, the angle information corresponding to the communications antenna and the beacon comprises a first included angle value of [−90°, 90°], wherein the parameters acquiring unit is further configured for:

when the first included angle value is positive, determining the rotation direction as a first preset direction, such as when the beacon is located toward the front surface of the communications antenna, the absolute value corresponding to the relative angle of the beacon and the perpendicular bisector of the front surface will become smaller if the communications antenna rotates according to the first preset direction; and when the first included angle value is negative, determining the rotation direction as a second preset direction which is opposite to the first preset direction; and determining the rotation angle as an absolute value corresponding to the first angle value.

Optionally, the angle acquiring unit is further configured to determine the second included angle value corresponding to the communications antenna and beacon after the rotation device drives the communications antenna to rotate a present angle which is less than the rotation angle;

the communication positioning apparatus further comprises: a first determining unit, configured to determine the magnitude of the absolute values of the first included angle value and the second included angle value, wherein if the absolute value corresponding to the second included angle value is less than the absolute value corresponding to the first included angle value, it is determined that the beacon is located toward the front surface of the communications antenna; or if the absolute value corresponding to the second included angle value is greater than the absolute value corresponding to the first included angle value, it is determined that the beacon is located toward a back surface of the communications antenna.

Optionally, the communications positioning apparatus further comprises:

a speed acquiring unit, for determining a first rotation speed of the rotation device at the start of rotation and determining a second rotation speed of the rotation device after the rotation device drives the communications antenna to rotate a preset angle which is less than the rotation angle; and a second determining unit, for determining whether the second rotation speed is slower than the first rotation speed;

if the second rotation speed is slower than the first rotation speed, it is determined that the beacon is located toward the front surface of the communications antenna; or if the second rotation speed is faster than the first rotation speed, it is determined that the beacon is located toward a back surface of the communications antenna.

An embodiment of the present invention further provides a communications positioning apparatus comprising a communications antenna and a rotation device. The communications antenna comprises at least two antennas, the rotation device drives the communications antenna. The communications positioning apparatus comprises a controller, configured for receiving a first command, wherein the first command turns on a positioning mode; in response to the first command, angle information corresponding to the communications antenna and a beacon is received; in accordance with the angle information, corresponding rotation parameters of the rotation device is determined, wherein the rotation parameters comprise at least a rotation direction and a rotation angle; and in accordance with the rotation parameters, the rotation device to drive the rotation direction and rotation angle corresponding to the communications antenna is controlled, such that a front surface of the communications antenna is perpendicular to the beacon, or such that the beacon is located within a first included angle range of the front surface of the communications antenna, wherein the perpendicular front surface is within the first included angle range of the front surface of the communications antenna.

An embodiment of the present invention also provides a computer storage medium storing computer-executable instructions for executing the antenna control method.

According to a proposed embodiment of the present invention, when executing antenna control, a first command is acquired, wherein the first command turns on a positioning mode; in response to the first command, angle information corresponding to the communications antenna and a beacon is acquired; in accordance with the angle information, determining corresponding rotation parameters of the rotation device, wherein the rotation parameters comprise at least a rotation direction and a rotation angle; and in accordance with the rotation parameters, controlling the rotation device to drive the rotation direction and rotation angle corresponding to the communications antenna, such that the beacon is on the perpendicular bisector of the front surface of the communications antenna, or such that the beacon is located within a first included angle range of the front surface of the communications antenna, wherein the perpendicular bisector of the front surface is within the first included angle range of the front surface of the communications antenna. Namely, by controlling the rotation of the antenna such that the beacon is located within a high measurement precision range having the best performance of the antenna, measurement precision is improved, ensuring the precision and complete directions of positioning.

DETAILED DESCRIPTION

Through the techniques set forth in the embodiments of the present invention, by controlling the rotation of the antenna such that the beacon is located within a high measurement precision range for the best performance of the antenna, the current technical problem for UWB, wherein when signals arrive from angles for positioning, within some ranges, measurement precision is low, is solved; thus improving measurement precision.

The main principles, specific implementation methods, and corresponding advantages of the embodiments of the present invention will be described in detail with reference to the accompanying drawings.

Embodiments

Figure 1:
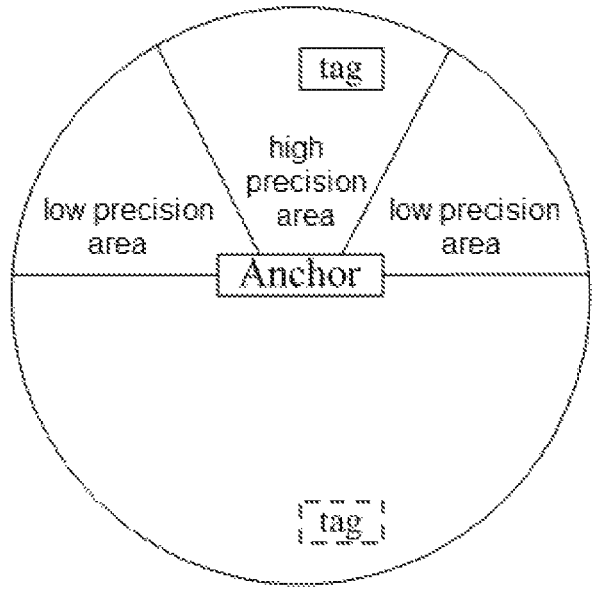
FIG. 1 is a diagram of the measurement precision of the different locations corresponding to the antenna and beacon of the prior art.
Figure 2:
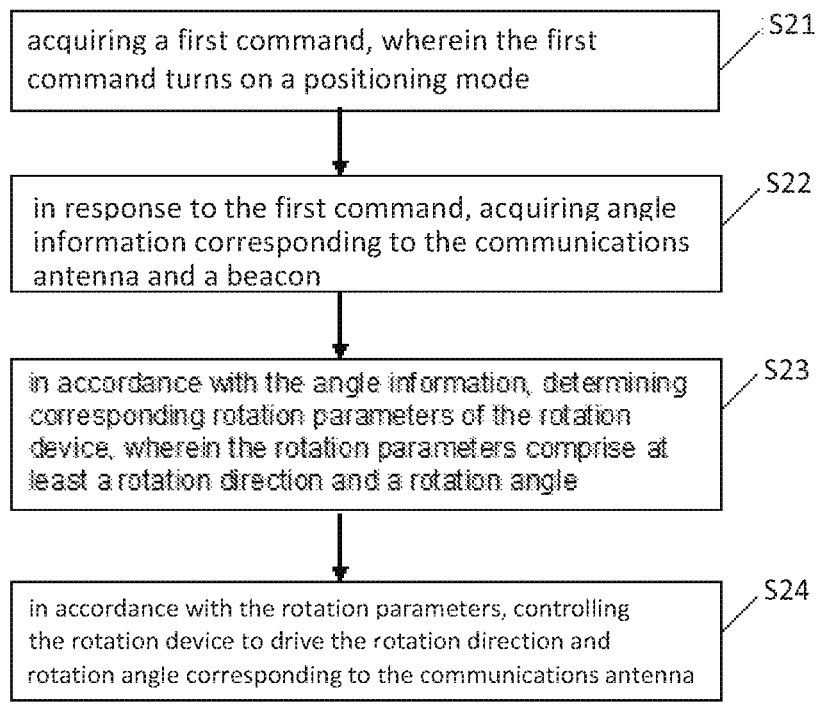
FIG. 2 is a flow chart of an antenna control method according to an embodiment of the present invention.

Referring to FIG. 2, in an embodiment of the invention, an antenna control method that is used in a communications positioning apparatus is provided, the communications positioning apparatus comprises a communications antenna and a rotation device, the communications antenna comprises at least two antennas, the rotation device drives the communications antenna, the method comprising:

S21: acquiring a first command, wherein the first command turns on a positioning mode;

S22: in response to the first command, acquiring angle information corresponding to the communications antenna and a beacon;

S23: in accordance with the angle information, determining corresponding rotation parameters of the rotation device, wherein the rotation parameters comprise at least a rotation direction and a rotation angle; and S24: in accordance with the rotation parameters, controlling the rotation device to drive the rotation direction and rotation angle corresponding to the communications antenna, such that the beacon is on the perpendicular bisector of the front surface of the communications antenna, or such that the beacon is located within a first included angle range of the front surface of the communications antenna, wherein the perpendicular bisector of the front surface of the communications antenna is within the first included angle range of the front surface of the communications antenna.

In a specific embodiment, by S21, the first command may be determined through the command sent by the communications positioning apparatus itself, or the first command may be determined through the command transmitted from other control devices such as a remote control, wherein the communications positioning apparatus may automatically send a first command upon detection of movement of a beacon or a first command in response to detection that a certain button has been operated.

In the step of S22: in response to the first command, the phase difference of the beacon signal which is received through at least two antennas of the communications antenna is used to calculate the angle information corresponding to the communications antenna and beacon. The angle information corresponding to the communications antenna and beacon comprises: a first included angle value corresponding to the beacon and the perpendicular bisector of the communications antenna. The first included angle value within in the range of [−90°, 90°]. The positive and negative values of the first included angle value are used to determine which side of the perpendicular bisector of the communications antenna corresponding to the beacon is located. For example, when the first included angle value is positive, it is determined that the beacon is located toward the right side of the perpendicular bisector of the communications antenna, and when the first included angle value is negative, it is determined that the beacon is located toward the left side of the perpendicular bisector of the communications antenna.

In the step of S23: in accordance with the angle information corresponding to the communications antenna and beacon, rotation parameters of the rotation device are determined. The rotation parameters may comprise a rotation speed in addition to the rotation direction and a rotation angle.

(1) Rotation direction: when the first included angle value corresponding to the communications antenna and beacon is positive, the rotation direction of the rotation device is determined as a first preset direction, wherein when the beacon is located toward the front surface of the communications antenna, the absolute value corresponding to the angle corresponding to the rotated first preset direction perpendicular bisector to the beacon is smaller; and when the first included angle value corresponding to the communications antenna and beacon is negative, the rotation direction of the rotation device is determined as a second preset direction which is opposite to the first preset direction, and when the beacon is located toward the front surface of the communications antenna, the absolute value corresponding to the angle corresponding to the rotated second preset direction perpendicular bisector to the beacon is smaller.

The first preset direction and the second preset direction is set by pre-trial: placing the beacon toward the front surface of the communications antenna, by default setting the first preset direction to be clockwise, when initially detecting that the first included angle value is $+\theta_1$, controlling the rotation device to drive the communications antenna to rotate to a smaller angle in the clockwise direction and then detecting the first angle value $+\theta_2$, and if $\theta_2<\theta_1$, it is determined that the first preset direction is a clockwise direction and the second preset direction is a counter clockwise direction. Alternately, if $\theta_2>\theta_1$, then it is determined that the first preset direction is a counterclockwise direction and the second preset direction is a clockwise direction.

(2) Rotation angle: the absolute value corresponding to the first angle value corresponding to the communications antenna and beacon is determined as the rotation angle.

(3) Rotation speed: the rotation speed according to the absolute value corresponding to the angle information corresponding to the communications antenna and the beacon is determined. The larger the absolute value corresponding to the angle is, the higher the rotation speed is determined, such that the communications antenna can be quickly rotated to be perpendicular to the beacon, or the beacon is located within a first included angle range of the front surface of the communications antenna. Alternately, the smaller the absolute value corresponding to the angle, the smaller the rotation speed is, such that the communications antenna can be accurately rotated to be perpendicular to the beacon, or the beacon is located within a first included angle range of the front surface of the communications antenna.

In the step of S24: according to the determined rotation parameters, the rotation device is controlled to drive the communications antenna to rotate according to the determined rotation direction and rotation angle. When rotating, the absolute value corresponding to the communications antenna and beacon during rotation to is constantly determined and the rotation angle is constantly adjusted until the front surface of the communications antenna is perpendicular to the beacon (i.e., the angle corresponding to the communications antenna and the beacon is zero degrees), or the beacon is located within a first included angle range (i.e., a high-precision region of the communications antenna). The perpendicular bisector of the front surface of the communications antenna is within the first included angle range. Specifically, the absolute value $|\theta|$ of the angle corresponding to the communications antenna and the beacon can be determined in real time during the rotation, and $|\theta|$ is input as an input parameter to the PID (Proportion Integral Derivative) controller. The PID controller outputs the rotation speed of the rotation device according to the input parameter $|\theta|$, thus forming a real-time control system, such that the communications antenna anchor always faces the beacon tag through the real-time rotation device.

In a specific embodiment, if the beacon is located toward a front surface of the communications antenna, the absolute value of the angle between the communications antenna and the beacon is gradually decreased when the communications antenna is rotated in accordance with the determined rotation direction and the rotation angle, but if the beacon is located toward the back surface of the communications antenna, when the communications antenna is rotated in accordance with the determined rotation direction and the rotation angle, the absolute value of the angle between the communications antenna and the beacon is gradually increased and continued to be rotated in the rotation direction. When the communications antenna rotates past 90°, the beacon is within the front surface of the communications antenna and continues to rotate in the rotation direction until the front of the communications antenna is perpendicular with the beacon, or the beacon is located within the high-precision range of the front surface of the communications antenna.

Thus, in the embodiment of the present invention, also determines a second included angle value corresponding to the communications antenna and the beacon after the rotation device drives the communications antenna to rotate a preset angle which is less than the rotation angle (the rotation angle is the absolute value corresponding to the first included angle value). Thereafter, compare the absolute value corresponding to the second included angle value and first included angle value. If the absolute value corresponding to the second included angle value is less than the absolute value corresponding to the first included angle value, then, it is determined that the beacon is located toward a front surface of the communications antenna. Alternately, if the absolute value corresponding to the second included angle value is greater than the absolute value corresponding to the first included angle value, it is determined that the beacon is located toward a back surface of the communications antenna, wherein the preset angle is less than the rotation angle in order to ensure that the orientation relationship corresponding to the communications antenna and the beacon (i.e., the beacon is toward the front surface or back surface of the communications antenna) has not changed, and concurrently, it can precisely determine whether the beacon is located toward the front surface or back surface of the communications antenna according to the second included angle value. The embodiments of the present invention do not limit the specific size of the preset angle, as long as it is smaller than the rotation angle, for example, the preset angle is 0.5, 0.25 times that of the rotation angle. For example, assuming that the first included angle value corresponding to the communications antenna and the beacon is detected to be +30°, after the control rotation device is rotated by 15° in a first preset direction, such as clockwise, a second included angle value corresponding to the communications antenna and beacon is detected. If the second included angle value is 45°, it is determined that the beacon is located toward the back surface of the communications antenna. Alternately, if the second included angle value is 15°, it is determined that the beacon is located toward the front surface of the communications antenna.

It is possible to determine whether the beacon is located toward the front surface or back surface of the communications antenna by the change in rotation speed during the rotation of the rotation device, as the faster the rotation speed of the rotation device is, the larger the rotation angle is. Similarly, a first rotation speed of the rotation device at the start of rotation is determined and a second rotation speed of the rotation device is determined after the rotation device drives the communications antenna to rotate a preset angle which is less than the rotation angle (the rotation angle is the absolute value corresponding to the first included angle value). Compare the second rotation speed and the first rotation speed. If the second rotation speed is smaller than the first rotation speed, it is determined that the beacon is located toward a front surface of the communications antenna. Alternately, if the second rotation speed is larger than the first rotation speed, it is determined that the beacon is located toward a back surface of the communications antenna.

In the embodiment of the present invention, it may further determines the angle corresponding to the communications positioning apparatus and the beacon when the rotation device drives the communications antenna to rotate such that the perpendicular bisector of the front surface of the communications antenna is toward the beacon, or the beacon is located within a high-precision area of the front surface of the communications antenna, wherein if the structure of the rotation device is different, so maybe the formula for calculating angle of the communication positioning device and beacon is different.

Figure 3:
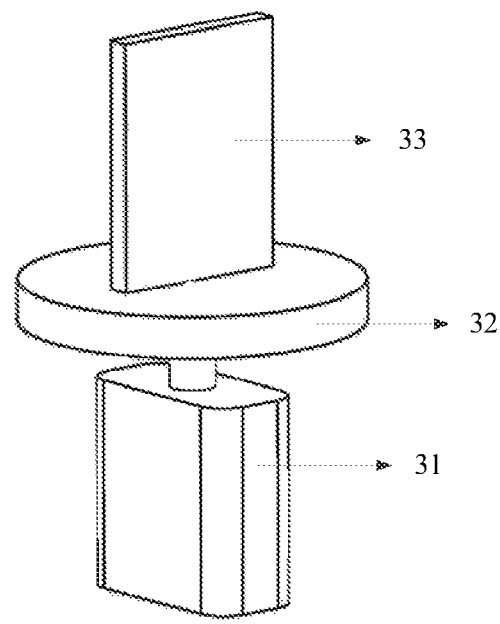
FIG. 3 is a schematic diagram of a rotation device according to an embodiment of the present invention.

Referring to FIG. 3, an embodiment of the present invention provides a rotation device comprises a motor 31, a rotation platform 32, and a positioning detector. The motor 31 is rotatably connected to a rotation platform 32 (such as a flange), and the communications antenna 33 is disposed on the rotation platform such that the motor 31 can drive the rotation of the communications antenna 33. The position detector is disposed on the rotation platform 32 or the motor 31 for detecting the rotation angle of the rotation platform 32 and the motor 31, wherein the position detector comprises a magnetic encoder, or a potentiometer or the like. The rotation device drives the communications antenna 31 through the rotation platform 32, thus the entire communications positioning apparatus does not rotate. Thus, when the beacon is on the perpendicular bisector of the front surface of the communications antenna or the beacon is located within the first included angle range of the communications antenna's front surface, the current rotation angle α of the rotation platform and the current angle θ corresponding to the communications antenna and beacon are determined through the positioning detector, calculating the sum of α+θ as the angle corresponding to the communications positioning apparatus and beacon. Thus, the angle corresponding to the communications positioning apparatus and beacon is determined as α+θ.

The embodiment of the present invention provides another rotation device, comprising: a main body, having a communications antenna disposed thereon. The main body has a steering adjustment device configured for adjusting rotation of the main body, wherein when the main body rotates, the communications antenna thereon also rotates. The steering adjustment device comprises a differential wheel or a rotor, such that the main body is rotated by adjusting the rotation speed of each differential wheel or each rotor to generate a lateral driving force. When the rotation device is driving the rotation of the communications antenna, as a whole, the communications positioning apparatus also rotates, thus, when the beacon is on the perpendicular bisector of the front surface of the communications antenna or the beacon is located within the first included angle range of the front surface of the communications antenna, the current angle θ corresponding to the communications antenna and beacon is directly determined to be the current angle corresponding to the communications positioning apparatus and beacon.

The specific embodiments of the antenna control method according to the present invention will now be described with reference to specific examples. Assuming that the communications antenna comprises a UWB terminal board anchor end and two antenna anchor ends. The UWB terminal board anchor end and two antenna anchor ends are integrated on a PCB (Printed Circuit Board), for example, the communications antenna is a PCB antenna, wherein the distance between the centers of the two antennas is less than half the wavelength of transmissions. For example, if the communications frequency used in this example is 6.5 GHz, then the distance between the centers of the two antennas is less than 2.31 cm. The rotating device is a flange device driven by the motor. The PCB antenna is fixed to the top of the flange. The following are examples wherein the PCB antenna detects different first angle values with the beacon tag (in particular, if the first included angle value is 0°, and if the front surface of the communications antenna is perpendicular to the tag, the rotation device will not rotate, and if the back surface of the communications antenna is perpendicular to the tag, deviation from 0° will occur because detection of the first angle value from the back surface is unstable, and once deviation occurs, the rotation of the rotation device will be triggered). The specific rotation of the rotation device will be described separately.

Example 1, the First Included Angle Value is $\theta_1 \in (0° \cdot 90°]$

Figure 4A:
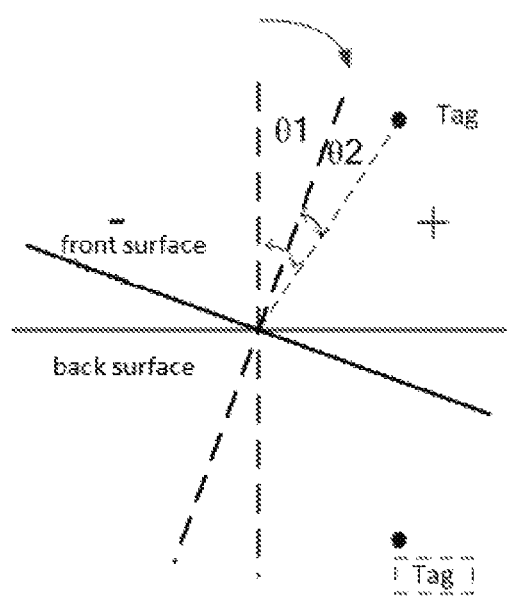
FIG. 4a is an illustration of antenna rotation, wherein a tag is located in the right half area of the front surface of the communications antenna according to an embodiment of the present invention.

When the first included angle value $\theta_1 \in (0°, 90°]$ corresponding to the communications antenna and beacon tag is detected, for example $\theta_1=30°$, if the first preset direction of the determined rotation device is a clockwise direction, the rotation device drives the communications antenna to rotate clockwise by a preset angle β, for example, 15°, and then determines the second angle value $\theta_2$ corresponding to the communications antenna and the beacon tag. There are two examples wherein $\theta_2$ will occur:

1. please refer to FIG. 4a, $|\theta_2|<|\theta_1|$, for example $\theta_2=15°$, indicating that the tag is moving closer and closer to the perpendicular bisector of the front surface of the communications antenna, the tag is located toward the front surface of the communications antenna, concurrently, $|\theta_2|$ is the feedback control of the rotation speed of the rotation device, controlling the rotation speed to be slowed, and controlling the rotation device driving the communications antenna to continue to rotate in the clockwise direction until the angle value corresponding to the communications antenna and the tag becomes 0° or close to 0° to complete the antenna control process.

Figure 4B:
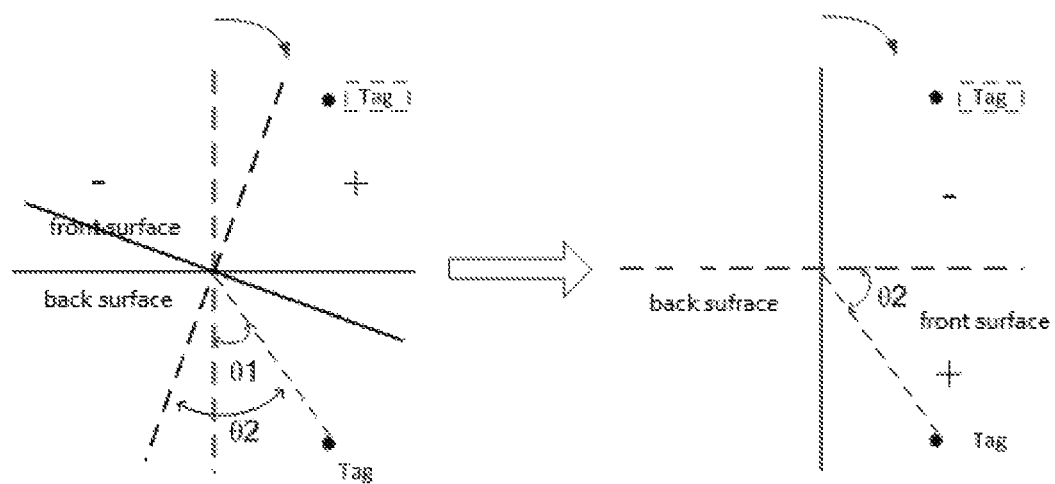
FIG. 4b is an illustration of antenna rotation, wherein a tag is located in the right half area of the back surface of the communications antenna according to an embodiment of the present invention.

2. please refer to FIG. 4b, $|\theta_2|>|\theta_1|$, for example $\theta_2=45°$, indicating that the tag is moving further and further away from the perpendicular bisector of the front surface of the communications antenna, the tag is located toward the back surface of the communications antenna, concurrently, $|\theta_2|$ is the feedback control of the rotation speed of the rotation device, controlling the rotation speed to be quickened, and controlling the rotation device driving the communications antenna to rotate quickly in the clockwise direction to pass 90°, such that the tag is located toward the front surface of the communications antenna, and continuing to rotate clockwise until the angle value corresponding to the communications antenna and the tag becomes 0° or close to 0° to complete the antenna control process.

Example 2, the First Angle Value is $\theta_1 \in [-90° \cdot 0°]$

Figure 5A:
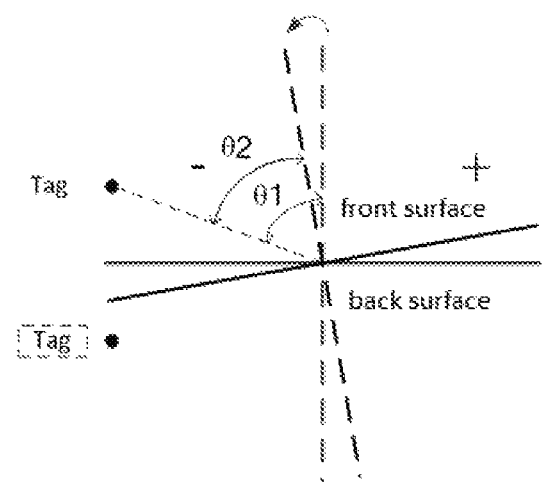
FIG. 5a is an illustration of antenna rotation, wherein a tag is located in the left half area of the front surface of the communications antenna according to an embodiment of the present invention.

When the first included angle value $\theta_1 \in [-90°, 0°)$ corresponding to the communications antenna and beacon tag is detected, for example $\theta_1 = -60°$, if the second preset direction of the determined rotation device is a counterclockwise direction, the rotation device drives the communications antenna to rotate counterclockwise by a preset angle β, for example, 15°, and then determines the second included angle value $\theta_2$ corresponding to the communications antenna and the beacon tag. There are two examples wherein $\theta_2$ will occur:

1. please refer to FIG. 5a, $|\theta_2|<|\theta_1|$, for example $\theta_2=-45°$, indicating that the tag is moving closer and closer to perpendicular bisector of the front surface of the communications antenna, the tag is located toward the front surface of the communications antenna, concurrently, $|\theta_2|$ is the feedback control of the rotation speed of the rotation device, controlling the rotation speed to be slowed, and controlling the rotation device driving the communications antenna to continue to rotate in the counterclockwise direction until the angle value corresponding to the communications antenna and the tag becomes 0° or close to 0° to complete the antenna control process.

Figure 5B:
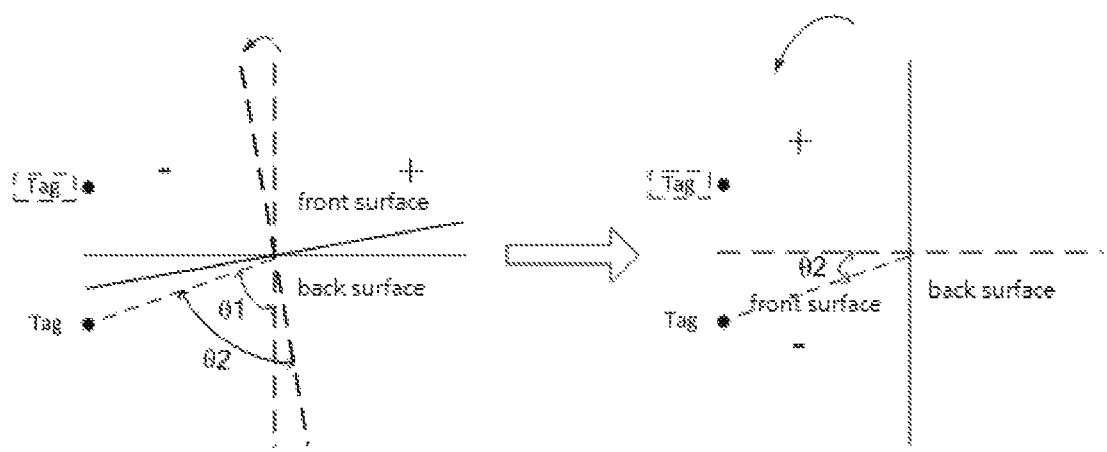
FIG. 5b is an illustration of antenna rotation, wherein a tag is located in the left half area of the back surface of the communications antenna according to an embodiment of the present invention.

2. please refer to FIG. 5b, $|\theta_2|>|\theta_1|$, for example $\theta_2=-75°$, indicating that the tag is moving further and further away from the perpendicular bisector of the front surface of the communications antenna, the tag is located toward the back surface of the communications antenna, concurrently, $|\theta_2|$ is the feedback control of the rotation speed of the rotation device, controlling the rotation speed to be quickened, and controlling the rotation device driving the communications antenna to rotate quickly in the clockwise direction to pass 90°, such that the tag is located toward the front surface of the communications antenna, and continuing to rotate counterclockwise until the angle value corresponding to the communications antenna and the tag becomes 0° or close to 0° to complete the antenna control process.

Figure 6:
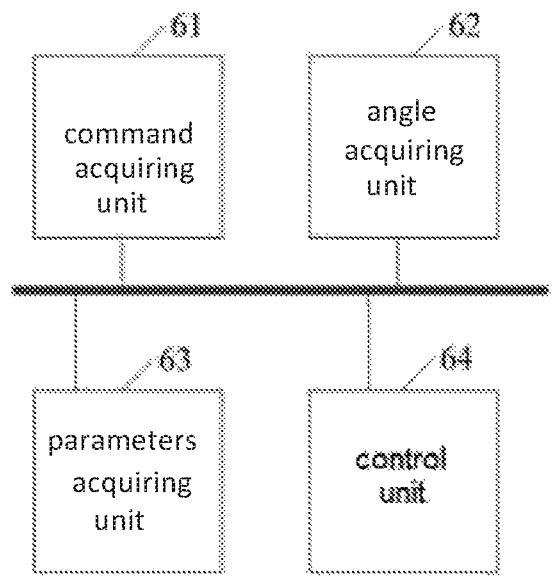
FIG. 6 is a diagram of a communications positioning apparatus according to an embodiment of the present invention.

Referring to FIG. 6, the embodiments of the present invention also provide a communications positioning apparatus, the communications positioning apparatus comprising a communications antenna and a rotation device, the communications positioning apparatus comprises at least two antennas, the rotation device can drive the communications antenna to rotate, wherein the communications positioning apparatus further comprises:

a command acquiring unit 61, configured to acquiring a first command, wherein the first command turns on a positioning mode, an angle acquiring unit 62, configured to in response to the first command, acquire an angle information corresponding to the communications antenna and a beacon;

a parameters acquiring unit 63, configured to determine the rotation parameters of the rotation device according to the angle information, wherein the rotation parameters comprise at least a rotation direction and a rotation angle; and a control unit 64, configured to control the rotation device to drive the communications antenna to rotate according to the rotation direction and rotation angle, such that the beacon is on the perpendicular bisector of the front surface of the communications antenna, or such that the beacon is located within a first included angle range of the front surface of the communications antenna, wherein the perpendicular bisector of the front surface of the communications antenna is within the first included angle range of the front surface of the communications antenna, wherein the rotation parameters further comprise a rotation speed, and wherein the rotation speed increases when the absolute value of the angle of the angle information corresponding to the communications antenna and the beacon increases.

In specific embodiments, a rotation device comprises a motor, a rotation platform, and a positioning detector. The motor is rotatably connected to a rotation platform, and the communications antenna is disposed on the rotation platform such that the motor can drive the rotation of the communications antenna. The position detector is disposed on the rotation platform or the motor, and configured for detecting the rotation angle of the rotation platform relative to the motor. In an embodiment, the communications position apparatus comprises a positioning unit, configured to, when the beacon is on the perpendicular bisector of the front surface of the communications antenna or the beacon is located within the first included angle range of the communications antenna, determine the current rotation angle α of the rotation platform and the current angle θ corresponding to the communications antenna and beacon through the positioning detector, and calculating the sum of α+θ as the angle corresponding to the communications positioning apparatus and beacon.

In an embodiment, the rotation device of a communications positioning apparatus comprises a main body, wherein the communications antenna apparatus is disposed on the main body. The main body comprises a steering adjustment device. The steering adjustment device adjusts the rotation of the main body, wherein when the main body rotates, the communications antenna thereon also rotates.

In an embodiment, the angle information corresponding to the communications antenna and the beacon comprises a first included angle value of [−90°, 90°]; the parameters acquiring unit 63, is specifically configured to:

when a first included angle value is positive, determining the rotation direction as a first preset direction, such as when the beacon is located toward the front surface of the communications antenna, the absolute value corresponding to the relative angle of the beacon and the perpendicular bisector of the front surface will become smaller if the communications antenna rotates according to the first preset direction; and when the first included angle value is negative, determining the rotation direction as a second preset direction which is opposite to the first preset direction; and determining the rotation angle as an absolute value corresponding to the first included angle value.

In a specific embodiment, the angle acquiring unit 62 is further configured to determine the second included angle value corresponding to the communications antenna and beacon after the rotation device drives the communications antenna to rotate a preset angle which is less than the rotation angle (the rotation angle is the absolute value corresponding to the first included angle value). The communications positioning apparatus comprises: a first determining unit, configured to determine the magnitude of an absolute value corresponding to second included angle value and first included angle value. If the absolute value of the second included angle is less than the absolute value of the first included angle value, it is determined that the beacon is located toward the front surface of the communications antenna. Alternatively, if the absolute value of the second included angle is greater than the absolute value of the first included angle value, it is determined that the beacon is located toward the back surface of the communications antenna.

In a specific embodiment, the communications positioning apparatus may further comprise a speed acquiring unit and a second determining unit. The speed acquiring unit is configured to determine a first rotation speed of the rotation device at the start of rotation and to determine a second rotation speed of the rotation device after the rotation device drives the communications antenna to rotate a preset angle which is less than the rotation angle. The second determining unit is configured to determine whether the second rotation speed is slower than the first rotation speed. If the second rotation speed is slower than the first rotation speed, it is determined that the beacon is located toward the front surface of the communications antenna. Alternately, if the second rotation speed is faster than the first rotation speed, it is determined that the beacon is located toward the back surface of the communications antenna.

Concerning the devices in the above embodiments, the specific manner in which operations of the corresponding units are performed has been described in detail in the embodiments of method, and will not be described in detail here.

In an embodiment, the command acquiring unit 61, the angle acquiring unit 62, the parameters acquiring unit 63, the control unit 64, the positioning unit, the first determining unit, the speed unit, and the second determining unit may be implemented by a controller of the communications positioning apparatus.

By one or more of the embodiments of the present invention, one or more of the following technical effects are achieved:

1. The embodiments of the present invention determine the angle information corresponding to the communications antenna and bacon, the rotation parameters of the rotation device, comprising rotation direction and rotation angle, are determined by the angle information, controlling the rotation device to drive the rotation direction and rotation angle corresponding to the communications antenna in accordance with the rotation parameters to rotate according to the determined rotation angle and the rotation angle of the rotation device; and according to the rotation parameters, controlling the rotation device to drive the rotation direction and rotation angle corresponding to the communications antenna, such that a front surface of the communications antenna is perpendicular to the beacon, or such that the beacon is located within a first included angle range of the front surface of the communications antenna by controlling the rotation of the antenna such that the beacon is located within a high measurement precision range having the best performance of the antenna, thus improving measurement precision, ensuring the precision and complete directions of positioning, thus solving the current technical problem for UWB, wherein when signals arrive from angles for positioning, within some ranges, measurement precision is low in the prior art. However, it should be noted that the antenna control method and apparatus according to the embodiments of the present invention are applicable not only to the field of measuring the angles for which signals are received based on the UWB technology, but also to other communications technologies fields of measuring the angles for which signals are received.

2. Through the processes of rotating the communications antenna of the embodiments of the present invention, it is determined whether the beacon is located toward a front surface or back surface of the communications antenna according to the change in angle corresponding to the communications antenna and beacon or change in rotation speed of the rotation device, thereby solving the technical problems wherein the communications antenna cannot determine whether the beacon is located toward the front side or back side.

It will be appreciated by those skilled in the art, that the embodiments of the present invention may be provided as a method, system, or in a computer program in a product. Accordingly, the present invention may be implemented in an embodiment incorporating software and hardware. Moreover, the present invention may be provided as a computer program product using one or more computer-readable storage mediums (including, but not limited to, disc memories, CD-ROMs optical memories, etc.), having computer program code therein.

The present invention is described with reference to flowcharts and/or block diagrams of a method, apparatus (system), and computer program product according to embodiments of the present invention. It is to be understood that each flowchart and/or block diagram of the flowcharts and/or block diagrams, as well as combinations of a flowchart and/or block diagram of the flowcharts and/or block diagrams, may be implemented by computer program commands.

These computer program commands can be provided to a general purpose computer, a special purpose computer, an embedded processor, or other programmable data processing device to produce a machine, such that the commands are generated by using a processor of a computer or other programmable data processing device for implementing the specific functions of the apparatus of the flowchart or flowcharts and/or block diagram or block diagrams.

These computer program commands may also be stored in a computer readable memory capable of directing a computer or other programmable data processing devices to operate in a particular manner, such that the commands stored in the computer readable memory are implemented, comprising in a manufacturing product of a command device, wherein the command device implements a specific function of the flowchart or flowcharts and/or block diagram or block diagrams.

These computer program commands may also be loaded onto a computer or other programmable data processing device, such that a series of process steps are implemented on the computer or other programmable device, wherein the implemented commands on the computer or other programmable data device provide the steps for implementing the specific functions of the flowchart or flowcharts and/or block diagram or block diagrams.

Accordingly, an embodiment of the present invention also provides a computer storage medium, the computer storage medium storing computer-executable instructions for executing the antenna control method of the embodiment of the present invention.

Although preferred embodiments of the present invention have been described, those skilled in the art, upon learning of the basic inventive concept, may make other alterations and modifications to these embodiments. Therefore, it is intended that the appended claims be interpreted as comprising the preferred embodiments and all alterations and modifications that fall within the scope of the present invention.

It will be apparent to those skilled in the art that various alterations and modifications can be made to the present invention without departing from the spirit and scope of the present invention. Thus, such modifications and alterations, insofar as they fall within the scope of the appended claims and their equivalents, are understood as being included in the present invention.

INDUSTRIAL APPLICABILITY

According to a proposed embodiment of the present invention, when executing antenna control, a first command is received, wherein the first command turns on a positioning mode; in response to the first command, angle information corresponding to the communications antenna and a beacon is received; in accordance with the angle information, determining corresponding rotation parameters of the rotation device, wherein the rotation parameters comprise at least a rotation direction and a rotation angle; and in accordance with the rotation parameters, controlling the rotation device to drive the rotation direction and rotation angle corresponding to the communications antenna, such that a front surface of the communications antenna is perpendicular to the beacon, or such that the beacon is located within a first included angle range of the front surface of the communications antenna, wherein the perpendicular front surface is within the first included angle range of the front surface of the communications antenna. Namely, by controlling the rotation of the antenna such that the beacon is located within a high measurement precision range having the best performance of the antenna, measurement precision is improved, ensuring the precision and complete directions of positioning.

What is claimed is:

1. An antenna control method that is used in a communications positioning apparatus comprising a communications antenna and a rotation device, wherein the communications antenna comprises at least two antennas and the rotation device drives the communications antenna, the method comprising:
    acquiring a first command, wherein the first command turns on a positioning mode;
    in response to the first command, acquiring angle information corresponding to the communications antenna and a beacon;
    in accordance with the angle information, determining corresponding rotation parameters of the rotation device, wherein the rotation parameters comprise at least a rotation direction and a rotation angle; and
    in accordance with the rotation parameters, controlling the rotation device to drive the rotation direction and the rotation angle corresponding to the communications antenna, such that the beacon is on a perpendicular bisector of a front surface of the communications antenna, or such that the beacon is located within a first included angle range of the front surface of the communications antenna, wherein the perpendicular bisector of the front surface of the communications antenna is within the first included angle range of the front surface of the communications antenna.

2. The method of claim 1, wherein the rotation parameters further comprise a rotation speed, and wherein:
    the rotation speed is a first speed when an absolute value of an angle of the angle information corresponding to the communications antenna and the beacon has a first magnitude, and
    the rotation speed is a second speed, greater than the first speed, when the absolute value of the angle of the angle information corresponding to the communications antenna and the beacon has a second magnitude greater than the first magnitude.

3. The method of claim 1, further comprising:
    when the beacon is on the perpendicular bisector of the front surface of the communications antenna, or when the beacon is located within the first included angle range of the front surface of the communications antenna, determining a current rotation angle α of a rotation platform of the rotation device, and determining a current angle θ corresponding to the communications antenna and the beacon, by a positioning detector of the rotation device; and
    calculating a sum of α and θ as an angle corresponding to the communications positioning apparatus and the beacon.

4. The method of claim 1, wherein the angle information corresponding to the communications antenna and the beacon comprises a first included angle value, the first included angle value is in the range of [−90°, 90°]; and
    in accordance with the angle information, determining corresponding rotation parameters of the rotation device comprises:
        when the first included angle value is positive, determining the rotation direction as a first preset direction, such as when the beacon is located toward the front surface of the communications antenna, an absolute value corresponding to a relative angle of the beacon and the perpendicular bisector of the front surface becomes smaller if the communications antenna rotates according to the first preset direction; and when the first included angle value is negative, determining the rotation direction as a second preset direction which is opposite to the first preset direction; and
        determining the rotation angle as an absolute value corresponding to the first included angle value.

5. The method of claim 4, further comprising:
    when the rotation device drives the communications antenna to rotate a preset angle which is smaller than the rotation angle, determining a second included angle value corresponding to the communications antenna and the beacon;
    determining a magnitude of the absolute value corresponding to the first included angle value and an absolute value corresponding to the second included angle value; and
    if the absolute value corresponding to the second included angle value is less than the absolute value corresponding to the first included angle value, determining that the beacon is located toward the front surface of the communications antenna; or
    if the absolute value corresponding to the second included angle value is greater than the absolute value corresponding to the first included angle value, determining that the beacon is located toward a back surface of the communications antenna.

6. The method of claim 4, further comprising:
   determining a first rotation speed of the rotation device at a start of rotation and determining a second rotation speed of the rotation device when the rotation device drives the communications antenna to rotate a preset angle which is smaller than the rotation angle;
   determining whether the second rotation speed is slower than the first rotation speed; and
   if the second rotation speed is slower than the first rotation speed, determining that the beacon is located toward the front surface of the communications antenna; or
   if the second rotation speed is faster than the first rotation speed, determining that the beacon is located toward a back surface of the communications antenna.

7. A communications positioning apparatus comprising a communications antenna and a rotation device, wherein the communications antenna comprises at least two antennas, the rotation device drives the communications antenna, and the communications positioning apparatus further comprises:
   memory storing processor-executable instructions; and
   a processor arranged to execute the processor-executable instructions to:
      acquire a first command, wherein the first command turns on a positioning mode;
      in response to the first command, acquire angle information corresponding to the communications antenna and a beacon;
      determine rotation parameters of the rotation device according to the angle information, wherein the rotation parameters comprise at least a rotation direction and a rotation angle; and
      control the rotation device to drive the communications antenna to rotate according to the rotation direction and the rotation angle, such that the beacon is on a perpendicular bisector of a front surface of the communications antenna, or such that the beacon is located within a first included angle range of the front surface of the communications antenna, wherein the perpendicular bisector of the front surface of the communications antenna is within the first included angle range of the front surface of the communications antenna.

8. The communications positioning apparatus of claim 7, wherein the rotation parameters further comprise a rotation speed, and wherein:
   the rotation speed is a first speed when an absolute value of an angle of the angle information corresponding to the communications antenna and the beacon has a first magnitude, and
   the rotation speed is a second speed, greater than the first speed, when the absolute value of the angle of the angle information corresponding to the communications antenna and the beacon has a second magnitude greater than the first magnitude.

9. The communications positioning apparatus of claim 7, wherein the rotation device comprises:
   a motor;
   a rotation platform, wherein the rotation platform is connected to the motor, and wherein the communications antenna is disposed on the rotation platform such that the motor drives the rotation of the communications antenna; and
   a positioning detector, disposed on the rotation platform or the motor, and configured for detecting the rotation angle of the rotation platform relative to the motor.

10. The communications positioning apparatus of claim 9, wherein the processor is arranged to execute the processor-executable instructions to:
   when the beacon is on the perpendicular bisector of the front surface of the communications antenna, or when the beacon is located within the first included angle range of the front surface of the communications antenna, determine a current rotation angle $\alpha$ of the rotation platform, and determine a current angle $\theta$ corresponding to the communications antenna and the beacon; and calculating a sum of $\alpha$ and $\theta$ as angle corresponding to the communications positioning apparatus and the beacon.

11. The communications positioning apparatus of claim 7, wherein the rotation device comprises:
   a main body, wherein the communications antenna is disposed on the main body; and
   a steering adjustment device of the main body, wherein the steering adjustment device is configured for adjusting a rotation of the main body, and wherein when the main body rotates, the communications antenna thereon also rotates.

12. The communications positioning apparatus of claim 7, wherein the angle information corresponding to the communications antenna and the beacon comprises a first included angle value of $[-90°, 90°]$; and
   the processor is arranged to execute the processor-executable instructions to:
      when the first included angle value is positive, determine the rotation direction as a first preset direction, such as when the beacon is located toward the front surface of the communications antenna, an absolute value corresponding to a relative angle of the beacon and the perpendicular bisector of the front surface becomes smaller if the communications antenna rotates according to the first preset direction; and
      when the first included angle value is negative, determining the rotation direction as a second preset direction which is opposite to the first preset direction; and
      determining the rotation angle as an absolute value corresponding to the first included angle value.

13. The communications positioning apparatus of claim 12, wherein the processor is arranged to execute the processor-executable instructions to:
   determine a second included angle value corresponding to the communications antenna and beacon after the rotation device drives the communications antenna to rotate a preset angle which is less than the rotation angle; and
   determine a magnitude of the absolute value corresponding to the first included angle value and an absolute value corresponding to the second included angle value, wherein if the absolute value corresponding to the second included angle value is less than the absolute value corresponding to the first included angle value, it is determined that the beacon is located toward the front surface of the communications antenna; or if the absolute value corresponding to the second included angle value is greater than the absolute value corresponding to the first included angle value, it is determined that the beacon is located toward a back surface of the communications antenna.

14. The communications positioning apparatus of claim 13, wherein the processor is arranged to execute the processor-executable instructions to:
   determine a first rotation speed of the rotation device at a start of rotation and determine a second rotation speed of the rotation device after the rotation device drives the communications antenna to rotate the preset angle which is less than the rotation angle; and determine whether the second rotation speed is slower than the first rotation speed; if the second rotation speed is slower than the first rotation speed, it is determined that the beacon is located toward the front surface of the communications antenna; or if the second rotation speed is faster than the first rotation speed, it is determined that the beacon is located toward a back surface of the communications antenna.

15. A communications positioning apparatus comprising a communications antenna and a rotation device, the communications antenna comprises at least two antennas, the rotation device drives the communications antenna, and the communications positioning apparatus further comprises:

memory storing processor-executable instructions; and a processor arranged to execute the processor-executable instructions to:

receive a first command, wherein the first command turns on a positioning mode; in response to the first command, angle information corresponding to the communications antenna and a beacon is received; in accordance with the angle information, corresponding rotation parameters of the rotation device is determined, wherein the rotation parameters comprise at least a rotation direction and a rotation angle; and in accordance with the rotation parameters, the rotation device configured to drive the rotation direction and the rotation angle corresponding to the communications antenna is controlled, such that a front surface of the communications antenna is perpendicular to the beacon, or such that the beacon is located within a first included angle range of the front surface of the communications antenna.

16. A computer storage medium storing computer-executable instructions for executing the antenna control method of claim 1.

17. The method of claim 1, wherein, in response to the first command, acquiring angle information corresponding to the communications antenna and a beacon comprises:

acquiring the angle information based upon a signal received through a first antenna of the at least two antennas and a signal received through a second antenna of the at least two antennas.

18. The method of claim 1, wherein, in response to the first command, acquiring angle information corresponding to the communications antenna and a beacon comprises:

receiving a signal through a first antenna of the at least two antennas;

receiving a signal through a second antenna of the at least two antennas; and determining a phase difference between the signal received through the first antenna and the signal received through the second antenna.

19. The method of claim 1, wherein the communications antenna comprises an ultra wideband (UWB) terminal board.

20. The method of claim 1, wherein the rotation parameters further comprise a rotation speed and wherein the rotation speed is set as a function of an angle of the angle information corresponding to the communications antenna and the beacon.

* * * * *